US 8,880,771 B2

(12) United States Patent
Subramaniyan et al.

(10) Patent No.: US 8,880,771 B2
(45) Date of Patent: Nov. 4, 2014

(54) METHOD AND APPARATUS FOR SECURING AND SEGREGATING HOST TO HOST MESSAGING ON PCIE FABRIC

(71) Applicant: PLX Technology, Inc., Sunnyvale, CA (US)

(72) Inventors: Nagarajan Subramaniyan, San Jose, CA (US); Jack Regula, Chapel Hill, NC (US); Jeffrey Michael Dodson, Portland, OR (US)

(73) Assignee: PLX Technology, Inc., Sunnyvale, CA (US)

( * ) Notice: Subject to any disclaimer, the term of this patent is extended or adjusted under 35 U.S.C. 154(b) by 226 days.

(21) Appl. No.: 13/660,791

(22) Filed: Oct. 25, 2012

(65) Prior Publication Data

US 2014/0122765 A1   May 1, 2014

(51) Int. Cl.
G06F 13/00 (2006.01)
G06F 13/40 (2006.01)

(52) U.S. Cl.
CPC ................................ *G06F 13/4022* (2013.01)
USPC .......................................... 710/316; 370/360

(58) Field of Classification Search
USPC ................... 710/316; 370/357, 360, 412, 474
See application file for complete search history.

(56) References Cited

U.S. PATENT DOCUMENTS

| 7,885,276 B1 * | 2/2011 | Lin ................................ 370/401 |
| 2004/0225883 A1 | 11/2004 | Weller et al. |
| 2007/0025387 A1 | 2/2007 | Zhang |
| 2008/0052443 A1 | 2/2008 | Cassiday et al. |
| 2009/0268738 A1 | 10/2009 | Tchapda |
| 2010/0061391 A1 | 3/2010 | Sindhu et al. |
| 2010/0061394 A1 | 3/2010 | Sindhu et al. |
| 2010/0165983 A1 | 7/2010 | Aybay et al. |
| 2011/0096781 A1 | 4/2011 | Aybay |
| 2011/0255540 A1 * | 10/2011 | Mizrahi et al. ................ 370/392 |
| 2011/0267942 A1 | 11/2011 | Aybay et al. |
| 2012/0155453 A1 | 6/2012 | Vohra et al. |

FOREIGN PATENT DOCUMENTS

| GB | 2299000 A | 9/1996 |
| GB | 2454309 A | 5/2009 |
| WO | 2006/127122 | 11/2006 |
| WO | 2007/006014 | 11/2007 |

OTHER PUBLICATIONS

"Virtual Fabrics Provide Administrative Flexibility in a Shared Storage Environment" (white paper); Brocade Communications Systems, Inc.; 2008.*

EP Search Report in Application No. EP13190203, dated Feb. 7, 2014.

* cited by examiner

*Primary Examiner* — Glenn A Auve
(74) *Attorney, Agent, or Firm* — Beyer Law Group LLP

(57) ABSTRACT

A PCIe fabric includes at least one PCIe switch. The fabric may be used to connect multiple hosts. The PCIe switch implements security and segregation measures for host-to-host message communication. A management entity defines a Virtual PCIe Fabric ID (VPFID). The VPFID is used to enforce security and segregation. The fabric ID may be extended to be used in switch fabrics with other point-to-point protocols.

23 Claims, 5 Drawing Sheets

METHOD AND APPARATUS FOR SECURING AND SEGREGATING HOST TO HOST MESSAGING ON PCIE FABRIC

CROSS-REFERENCE TO RELATED APPLICATION

This application incorporates by reference, in their entirety and for all purposes herein, the following co-pending U.S. patent application Ser. No. 13/624,781, filed Sep. 21, 2012, entitled, "PCI EXPRESS SWITCH WITH LOGICAL DEVICE CAPABILITY"; Ser. No. 13/212,700, filed Aug. 18, 2011, entitled, "SHARING MULTIPLE VIRTUAL FUNCTIONS TO A HOST USING A PSEUDO PHYSICAL FUNCTION"; and Ser. No. 12/979,904, filed Dec. 28, 2010, entitled "MULTI-ROOT SHARING OF SINGLE-ROOT INPUT/OUTPUT VIRTUALIZATION."

BACKGROUND OF THE INVENTION

1. Field of the Invention

The present invention relates generally to switches and electronic communication. More specifically, the present invention relates to improving security and segregation of host-to-host communications in an intelligent PCIe switch.

2. Description of the Related Art

Computer architectures have advanced greatly over the years. Lately, it is becoming more and more commonplace for chip designers to include external data interfaces, such as Universal Serial Bus (USB) interface controllers into their motherboards. These interfaces are known as host controllers. The processor is typically then connected to the other components of the computer system via an input/output (I/O) interconnect system.

There are many different computer I/O interconnect standards available. One of the most popular over the years has been the peripheral component interconnect (PCI) standard. PCI allows the bus to act like a bridge, which isolates a local processor bus from the peripherals, allowing a Central Processing Unit (CPU) of the computer to connect to a host of IO devices through this interconnect.

Recently, a successor to PCI has been popularized, termed PCI Express (or, simply, PCIe). PCIe provides higher performance, increased flexibility and scalability for next-generation systems, while maintaining software compatibility with existing PCI applications. Compared to legacy PCI, the PCI Express protocol is considerably more complex, with three layers—the transaction, data link and physical layers.

In a PCI Express system, a root complex device connects the processor and memory subsystem to the PCI Express switch fabric comprised of one or more switch devices (embodiments are also possible without switches, however). In PCI Express, a point-to-point architecture is used. Similar to a host bridge in a PCI system, the root complex generates transaction requests on behalf of the processor, which is interconnected through a local I/O interconnect. Root complex functionality may be implemented as a discrete device, or may be integrated with the processor. A root complex may contain more than one PCI Express port and multiple switch devices can be connected to ports on the root complex or cascaded.

The Assignee of the present invention has developed various PCIe switches, described in U.S. patent application Ser. Nos. 13/624,781, 13/212,700, and 12/979,904, which provide general background information on PCIe switches. As an example, FIG. 1 is a block diagram depicting a normal shared IO architecture having a standard PCIe switch 102 controlled by a management host running switch management software. Switch 102 services one or more hosts, shown as connected host 106 and connected host 108 (also referred to as "local hosts"), for example servers, PCs, and other computing devices. Also connected to switch 102 are one or more devices 110-116 that typically provide some type of function or service for the connected hosts. Within switch 102 are virtual devices 118-124. Virtual devices 118 and 120 are connected to connected host 106, and virtual devices 122 and 124 are connected to connected host 108. Some of these virtual devices have data paths to physical devices 110-114. The functionality and roles of virtual devices 118-124 are described in co-pending application U.S. patent application Ser. No. 12/979,904, entitled "MULTI-ROOT SHARING OF SINGLE-ROOT INPUT/OUTPUT VIRTUALIZATION," where a solution was described that used resource redirection methods when multiple hosts are connected using the non-transparent ports of a PCIe switch that supports shared I/O mechanisms.

As another example, FIG. 2 is a block diagram depicting a PCIe switch having a logical device and a management host system with logical device enabling software, and is described in U.S. patent application Ser. No. 13/624,781, entitled "PCI EXPRESS SWITCH WITH LOGICAL DEVICE CAPABILITY," the content of which are incorporated by reference. Shown is an innovative PCIe switch 202 connected to a host 204 and three physical devices 206-210. A management system host 212 with logical device software, and other necessary software for operating the management system, is connected to switch 202. The logical device enabling software implements a logical device 214 (also referred to as a consolidated virtual device) shown by the dashed-line box. Logical device 214 operates virtually with connected host 204. It has data paths going to physical devices 206-210. Management system host 212 has control paths shown by the dashed lines to the physical devices 206-210 that implement logical device 214. These control paths are dashed to indicate that they essentially emanate from the logical device enabling software in management system 212, and are responsible for physically implementing logical (virtual) device 214. The logical device is also tied to a Direct Memory Access (DMA) engine.

U.S. patent application Ser. No. 13/212,700, filed Aug. 18, 2011, entitled, "SHARING MULTIPLE VIRTUAL FUNCTIONS TO A HOST USING A PSEUDO PHYSICAL FUNCTION" describes a PCIe switch having virtualized physical functions. The contents of U.S. patent application Ser. No. 13/212,700 are incorporated by reference to provide context on other PCIe switch implementations of the Assignee of the present invention.

As the cluster size and functionality of PCIe switches continues to increase, security of message flows is a potential concern. The inventors of the present patent application have recognized that conventional security approaches are inadequate to address these issues.

SUMMARY OF THE INVENTION

One aspect of the invention is a method of enhancing the functionality of a switch fabric having a point-to-point protocol, such as PCI Express. A virtual fabric ID is used to enforce security and segregation of host-to-host message flows for host coupled to the switch fabric.

In one embodiment, a PCI express switch includes a management host. The management host is used by an administrator to define a management table and associated virtual fabric IDs. Host computer systems are coupled to ports of the PCI express switch. The PCI express switch drops message packets not tagged with an approved virtual fabric ID, thereby enforcing security and segregation of host-to-host message flows.

DETAILED DESCRIPTION OF SPECIFIC EMBODIMENTS

Reference will now be made in detail to specific embodiments of the invention, including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

In accordance with the present invention, the components, process steps, and/or data structures may be implemented using various types of operating systems, programming languages, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. The present invention may also be tangibly embodied as a set of computer instructions stored on a computer readable medium, such as a memory device.

The inventors of the present patent application have recognized that there is a problem with PCI Express (PCIe) switch fabric architectures. In particular, the prior art does not provide adequate security and segregation features for host-to-host communications via a switch fabric using a point-to-point protocol such as PCIe.

Figure 1:
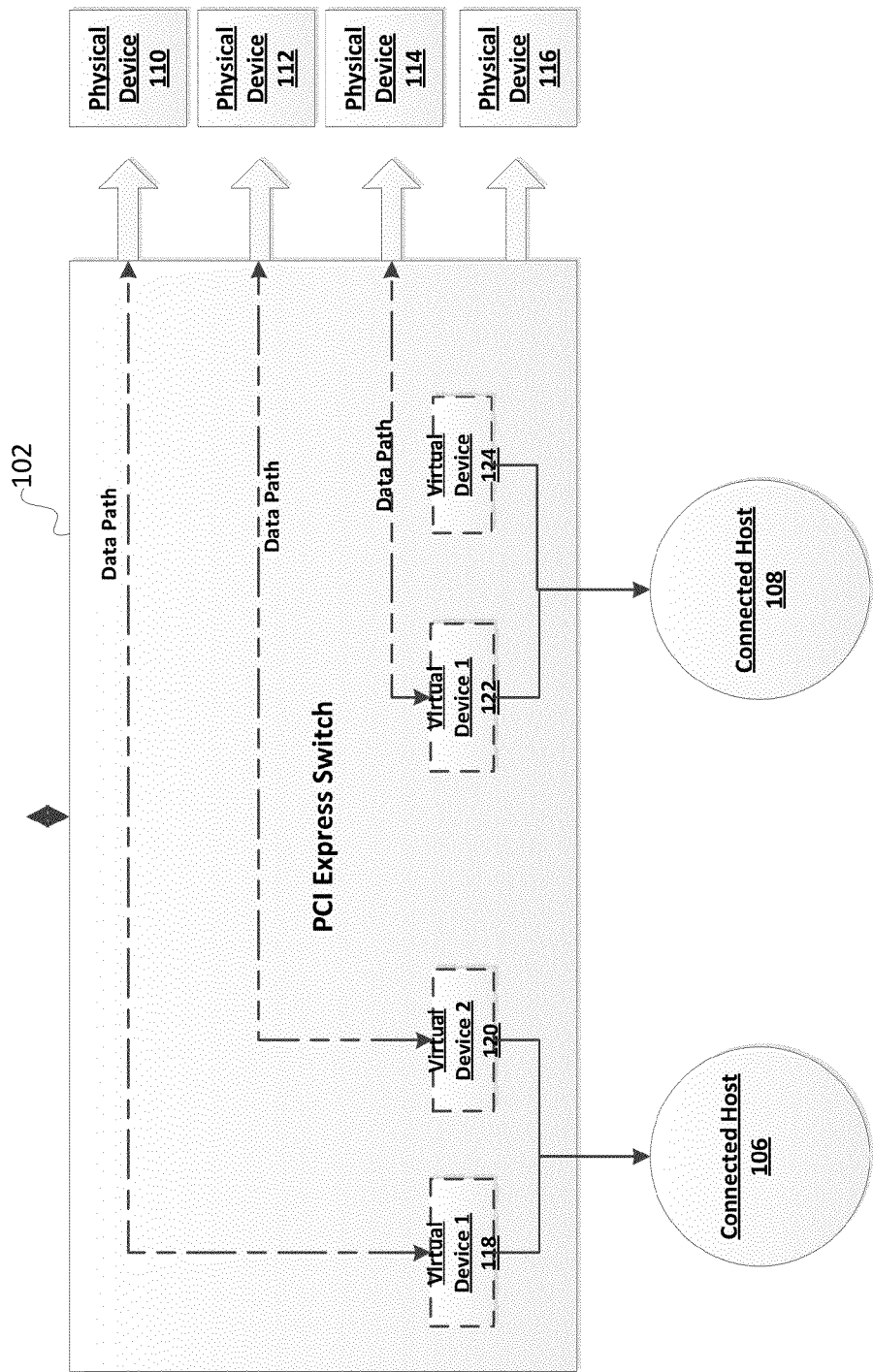
FIG. 1 is a block diagram depicting a normal shared IO architecture having a standard PCIe switch controlled by a system management host running switch management software.
Figure 2:
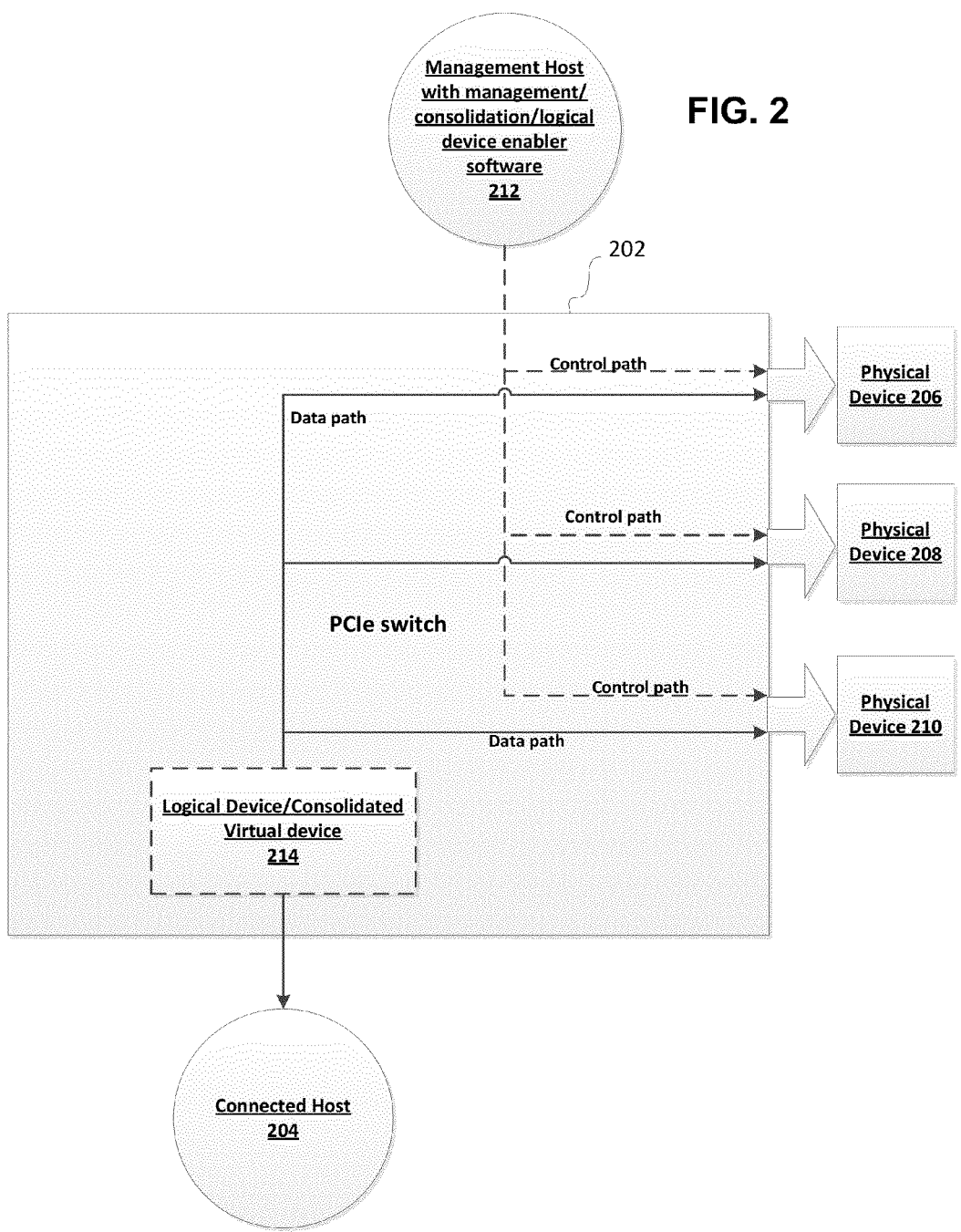
FIG. 2 is a block diagram depicting a PCIe switch having a logical device and a management host system with logical device enabling software in accordance with co-pending U.S. patent application Ser. No. 13/624,781.
Figure 3:
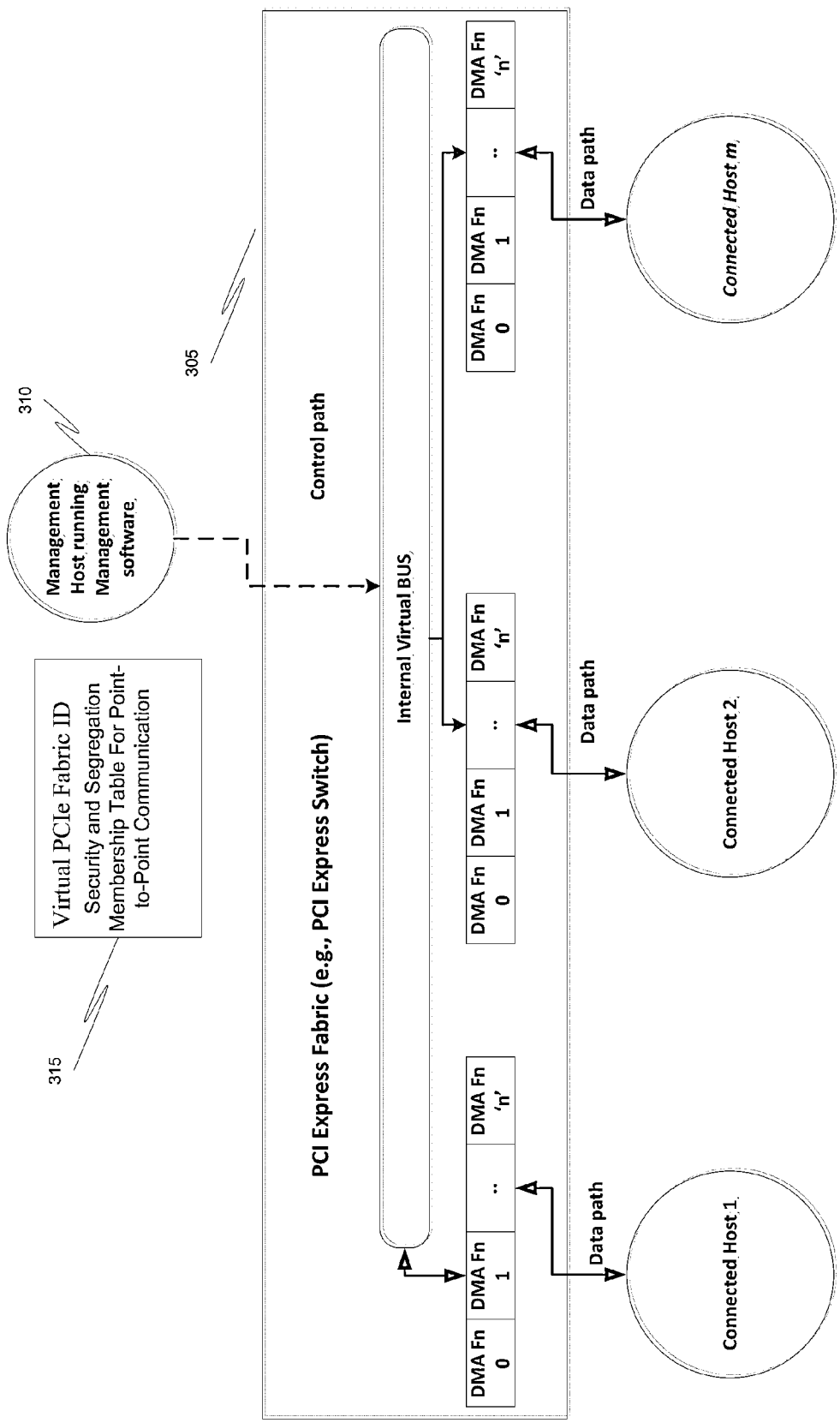
FIG. 3 is a block diagram depicting a PCIe switch supporting security and segregation in accordance with one embodiment of the present invention.

FIG. 3 illustrates a PCIe switch 305. In one implementation the PCI Express 305 is a Capella 2 switch from PLX Technology, Inc. of Sunnyvale, Calif. that includes next generation hardware and software hooks to implement security and segregation as described below in more detail.

The PCIe switch 305 includes an internal virtual bus, virtualized DMA engines and associated DMA functions. In particular there is support for multiple DMA functions (DMA Fn 0 . . . DMA Fn N) per port for a connected host, where as examples the DMA function may include replicating a Network Interface Card (NIC) function or a network storage function. Additional examples of virtualized physical function are described in U.S. patent application Ser. No. 13/212,700, entitled "SHARING MULTIPLE VIRTUAL FUNCTIONS TO A HOST USING A PSEUDO PHYSICAL FUNCTION," the contents of which are hereby incorporated by reference.

The management system shows up multiple DMA functions on a connected host. (Additional management details are described in U.S. patent application Ser. Nos. 13/624,781, 13/212,700 and 12/979,904, the contents of which are incorporated by reference). In one embodiment, the DMA functions exist in the switch and get mapped by the management software so the host DMA drivers operate on the switch hardware to do message passing across the PCIe fabric.

The messaging between nodes in the cluster in supported by various features. A Management CPU (MCPU) can show several logical DMA functions to any connected host and in one embodiment may, for example use the mechanisms described in patent application Ser. Nos. 13/624,781, 13/212,700 and 12/979,904. Once that is done, the DMA functions do show up as a PCIe end point similar to a networking end point on the connected host. A messaging driver is loaded on this end point that allows a messaging send/receive operations using the DMA functionality provided by the intelligent switch. Each such DMA function has a hardware ID that uniquely identifies this function in the PCIe fabric and all messaging work requests are routed by the switch based on this unique ID between connected hosts. With the facility for broadcast messaging mechanisms supported by the intelligent switch, each connected host can discover/identify the other connected hosts using these unique IDs.

Higher layer protocol drivers can construct a unique ID for this messaging interface/DMA function based on this unique hardware ID. As an example, the Ethernet tunneling software over this messaging interface can construct an Ethernet MAC address for this DMA interface based on the unique 24 bit PCIe fabric ID of the DMA interface. The RDMA layer drivers can construct a GID (Global ID) for the DMA interface using this same PCIe fabric ID. All these mappings, when they are made with a one-to-one correspondence between them, will work perfectly as the addressing mechanism for the messaging protocols.

Once discovery is done, applications on different connected hosts can talk to each other using the messaging transport provided by this DMA function. Examples of such applications include MPI applications or socket applications that are written for other fabrics can work seamlessly over this DMA messaging interface.

As this messaging is now enabled on the PCIe fabric between more than a handful of connected hosts, there is a need to segregate them based on the usage/deployment models of the network and provide additional security at the level of the interconnect (switch). An embodiment of the present invention addresses such a security/segregation mechanism based on virtual fabric ID tagging and enforcement.

The DMA functions serve as messaging/host-to-host communication channels between connected hosts on the PCIe fabric. This message passing functionality can be used to implement various upper layer protocols that were developed for other fabrics—such as Ethernet software tunneling over this PCIe messaging mechanism, and RDMA/Storage protocols running over this messaging mechanism.

In accordance with an embodiment of the present invention, security is provided for messaging as a whole—not a specific protocol based security mechanism, but as a common PCIe fabric based security mechanism using a virtual fabric ID.

A management host 310 includes a CPU and memory (not shown) and runs management software for the PCIe switch 305. The management software acts as a management entity and permits an administrator to manage switch operations.

A number of different host computer systems (Host 1, Host 2, ... Host M) may be connected to the PCI express switch, where each host has an associated CPU and memory. The host computer systems connected to the ports of the PCIe Fabric switch can communicate among themselves because all the host ports or nodes are part of a flat global space provided by the PCIe fabric switch.

Connecting the host computer systems together via a PCIe fabric creates a potential security concern, particularly as the number of host systems connected by the fabric increases. As an illustrative (but non-limiting) example, the PCIe Fabric may correspond to a cluster size of eight, sixteen, thirty-two, or sixty-four coupled host computer systems. The cluster may also correspond to a rack-level size. Extending the fabric to larger sizes makes security and message segregation an important issue. For example, in many application environments, it is crucial to enforce security and prevent unauthorized access to host-to-host message flows within a cluster.

The management host 310 utilizes a security and membership table 315 stored in a memory (not shown) to enforce security and segregation by defining a Virtual PCIe Fabric ID (VPFID), which is a mechanism that allows each host port to be a part of a finite set of port groups. In one embodiment, a management entity (of the management software) manages the PCIe switch and is the only entity that can control this membership, using the membership table in the PCIe switch. Once a PCIe switch is configured with VPFID based membership, the PCIe switch can enforce strict rules based on this membership.

The message flows may be tagged with the VPFID, using vendor defined messages, for host to host communication between host ports. The PCIe specification includes a provision for vendor defined messages.

In one embodiment, each port can be configured by the management entity to follow one of a set of rules:

tag each outgoing host-to host-communication packet with the VPFID (as part of a vendor defined message) with a default VPFID of that port, in hardware; and the host software tags the host-to-host communication with one of the allowed VPFID for that port (where the management entity sets this membership for one or more VPFID per port).

In one embodiment, the host-to-host communication may be filtered based on the VPFID on both send and receive according to the following set of rules:

every host-to-host packet out of a port has to be tagged with one of the valid VPFIDs for that port, else the packet is dropped. An error can be reported on this to the management entity, when a packet is dropped; and every receiving port also checks for a valid VPFID in the incoming packet and drops invalid VPFID tagged host-to-host packets. An error can be reported in case of drops to the management entity.

In one embodiment, there are several exceptions to these rules. The management entity should always be allowed to have host-to-host communication with any of the ports and so, a special VPFID may be reserved for the management communications. When the VPFID is not used in a PCIe fabric, a default rule can be that the ports are assumed to be using a single VPFID. Additionally, it will be understood that these rules are merely examples and that the rules may be varied for a particular switch implementation.

Figure 4:
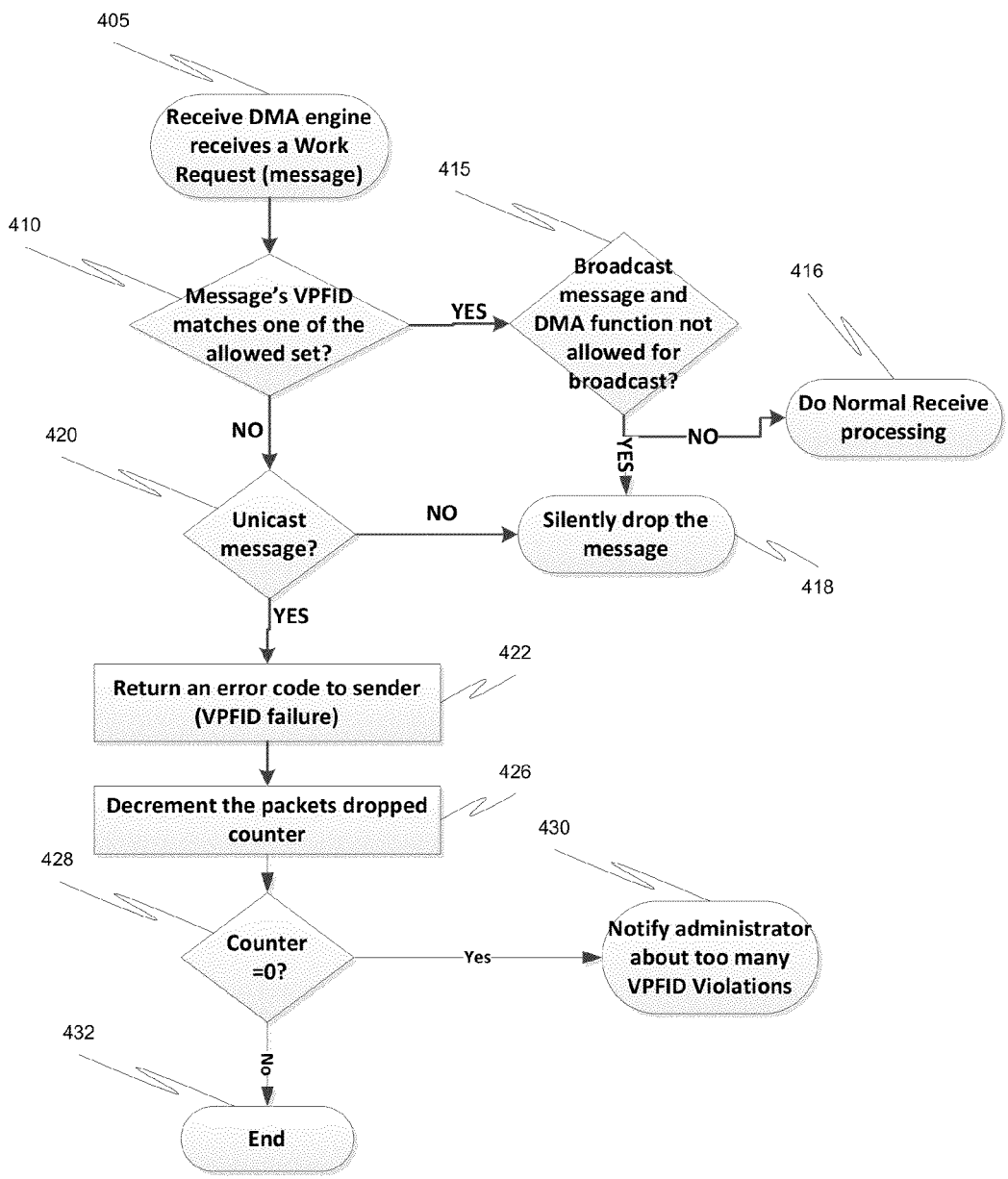
FIG. 4 is a flow diagram of receive processing for a Virtual PCIe Fabric ID in accordance with one embodiment of the present invention.

FIG. 4 is a flowchart illustrating in more detail receive processing for VPIFD in accordance with an embodiment of the present invention. In one implementation, the receive DMA engine processing may be performed in hardware. In 405, a receive DMA engine receives a work request, corresponding to a message. In 410, a decision is made whether the VPFID matches one of the allowed set. If yes, a decision is made in 415 whether the broadcast message and DMA function is not allowed for broadcast. If not, normal receive processing is performed in 416. If yes, the message is silently dropped in 418.

Returning to 410, if the message VPFID does not match any of the allowed set, then a determination is made in 420 whether the message is a unicast message. If not, the message is silently dropped in 418. However, if the message is a unicast message then an error code is returned to the sender in 422 to indicate a VPFID failure. A packet dropped counter is decremented in 426 and if the counter is determined 428 to equal to zero, then the administrator is notified in 430 that there are too many VPFID violations. Otherwise, the process ends in 432.

Figure 5:
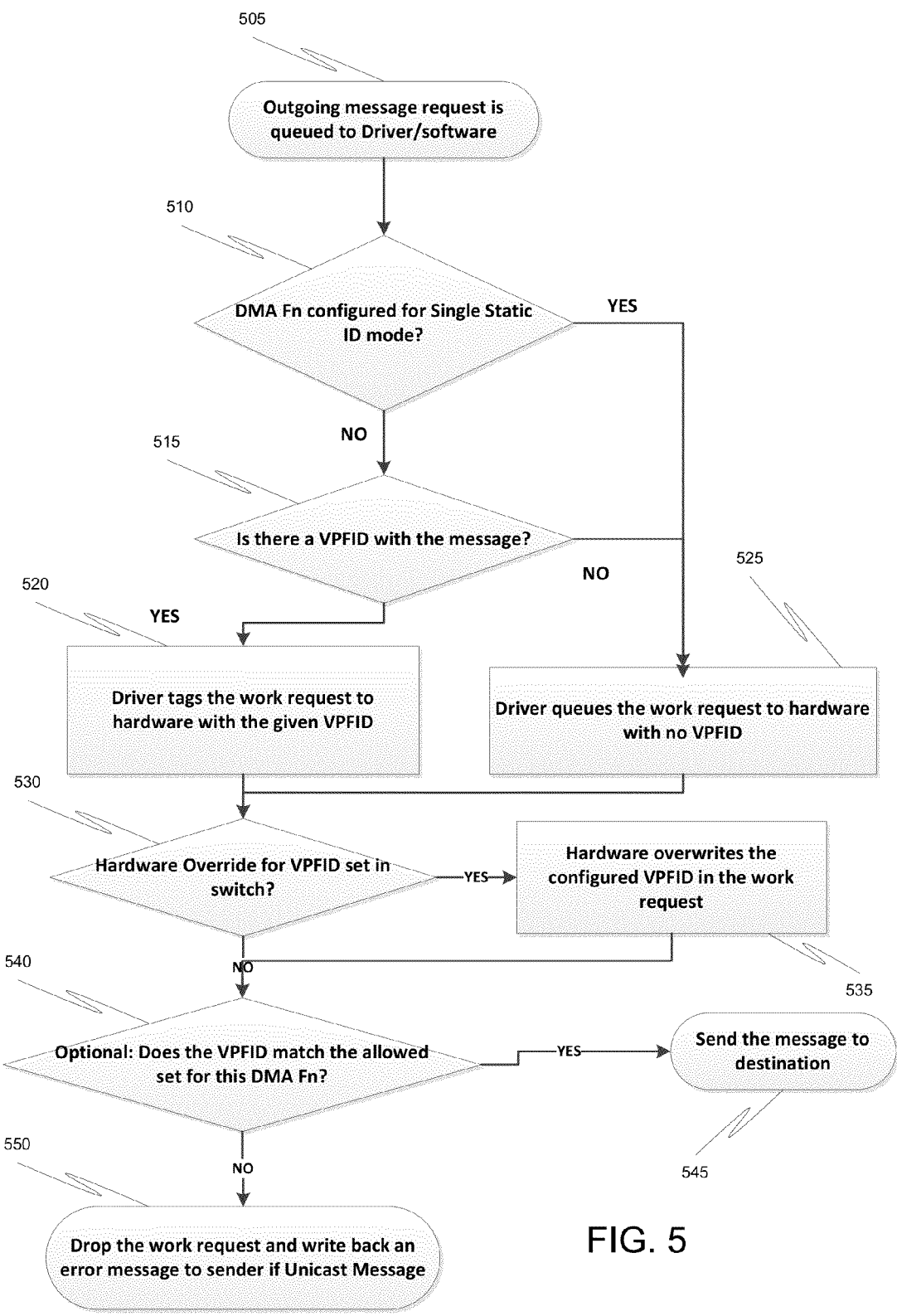
FIG. 5 is a flow diagram of a send processing for Virtual PCIe Fabric ID in accordance with one embodiment of the present invention.

FIG. 5 is a flowchart illustrating in more detail send processing for VPFID in accordance with an embodiment of the present invention in which there is sending side software/hardware processing. In 505, an outgoing message request is queued to driver software. In 510, a determination is made if the DMA function is configured for single static ID mode. If yes, then in 525, the driver queues the work request to hardware with no VPFID. If no, in 515, a determination is made if there is a VPFID with the message. If yes, then in 520, the driver tags the work request to hardware with the given VPFID. If no, then in 525, the driver queues the work request to hardware with no VPFID.

A determination is made in 530 whether a hardware override for VPFID is set in the switch. If yes, the hardware overwrites the configured VPFID in the work request. If no, a determination (optional) made whether the VPFID matches the allowed set for the DMA fn. If yes, the message is sent to its destination in 545. If not, the work request may be dropped and an error message generated in 550.

A PCIe fabric administrator, via the management entity, is able to define secure PCIe subnets for host to host communications among connected ports, thus dividing the fabric in to a virtual, and unconnected PCIe networks, with very little run time overhead in software. In one embodiment, the fabric administrators (trusted entities) sets up the following settings:

a. single VPFID/DMA function or multiple VPFID mode on a per DMA function basis (default: single VPFID mode);

b. by default, the entire fabric uses VPFID 1 (a default VPFID) and all DMA functions are set to this setting;

c. administrators can change this VPFID setting to what they want depend on the security subnets they want in the fabric; and d. when administrators change the setting to multiple VPFID mode on a DMA function, it is their responsibility to administer the host system that uses that DMA function also to configure its software to use these multiple VPFIDs.

In one embodiment, an Ethernet tunneling solution over a PCIe fabric that employs VPFID, can translate the Ethernet Virtual Local Area Network (VLAN) to a corresponding VPFID. This is mainly to enable backward compatibility with Ethernet applications. In a similar way, Infiniband's pkey (partition key) mechanism can also be mapped to VPFID. An exemplary use case model for this is mapping of Ethernet VLAN to a corresponding VPFID by the Ethernet tunneling software for PCIe fabric. The Ethernet stack can be configured to use multiple VLANs (with corresponding VPFIDs) and the Ethernet Tunneling software at the host system will translate that VLAN ID to VPFID while setting up work requests. Similarly, other security measures can be made compatible with VPFID by performing an analogous mapping function similar to that described in regards to VLAN. As additional examples, partition key of RDMA/Infiniband, just like VLAN of Ethernet and other such security IDs of other protocols, can be mapped to a corresponding VPFID.

One aspect of the VPFID is that it addresses the problem of security and segregation in a PCIe fabric. The number of nodes in a PCIe fabric has been increasing over the years. When the PCIe fabric extends to outside the box to multiple host systems, the necessity for security and access control on any host-to host communication between connected ports becomes a requirement in a typical data center/enterprise deployment. PCIe is a point-to-point protocol. There is no such solution in place for PCIe fabrics for host-to-host communication in the prior art and VPFID defines such a solution. It is a new solution to a critical problem for deployment of PCIe based fabrics.

Other fabrics having point-to-multipoint protocols solve the problem of security with different techniques. As an example, Ethernet, which is a broadcast medium, has a point-to-multipoint protocol and uses VLAN as a mechanism to enforce membership based security. However, VLAN required looking into the Ethernet Payload, by adding/stripping an additional VLAN header in each packet as it is moved in the Ethernet fabric. VLAN is closely tied to an Ethernet fabric, and as such can only be used for messaging applications that run on Ethernet protocol. The VPFID implementation differs from this VLAN implementation in several key areas:

VFPID is applied on a point-to-point-protocol;

The implementation of VPFID for PCIe fabric is applied only on messaging work requests, and not on all the packets or data traffic that results from this messaging work request. The basic PCIe protocol assures the security of this data traffic, and so, VPFID on the resulting data traffic is redundant.

While a specific example of a PCIe fabric has been discussed in detail, more generally, the present invention may be extended to apply to other point-to-point protocols. Most point-to-point networking protocols include features analogous to the vendor messaging of PCIe. That is, most point-to-point networking protocols can be adapted to include a Virtual Fabric ID (VFID). Thus, the present invention has potential application for other switch fabrics beyond those using PCIe.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is defined as any data storage device that can store data which can thereafter be read by a computer system. Examples of the computer readable medium include read-only memory, random-access memory, CD-ROMs, DVDs, magnetic tape, and optical data storage devices. The computer readable medium can also be distributed over network-coupled computer systems so that the computer readable code is stored and executed in a distributed fashion.

While the invention has been particularly shown and described with reference to specific embodiments thereof, it will be understood by those skilled in the art that changes in the form and details of the disclosed embodiments may be made without departing from the spirit or scope of the invention. In addition, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

What is claimed is:

1. A method of operating a switch fabric having a point-to-point network protocol, the method comprising:
receiving an input from a switch fabric administrator defining subnets;
generating a virtual fabric ID (VFID) for at least one defined subnet;
tagging packets of outgoing messages from at least one host with the virtual fabric ID; and
determining if an incoming message to at least one host has a tag matching the virtual fabric ID;
wherein receive processing for incoming messages is supported if the tag of the incoming message matches an approved virtual fabric ID and the message is dropped within the switch if the tag does not match the approved virtual fabric ID.

2. The method of claim 1, wherein the point-to-point protocol is PCI Express.

3. The method of claim 1, wherein said tagging is performed via vendor defined messaging.

4. The method of claim 1, wherein an error code is returned to a sender if the virtual fabric ID does not match.

5. The method of claim 1, wherein said determining includes checking every host-to-host packet coming out of a port and dropping the packet unless it has been tagged with a valid virtual fabric ID.

6. The method of claim 5, where said determining includes checking packets at each receiving port for a valid virtual fabric ID and dropping packets having invalid virtual fabric IDs.

7. The method of claim 1, wherein the switch fabric includes virtual Direct Memory Access (DMA) engine functions for each port, wherein said receiving comprises: receiving from a fabric administrator one or more settings defining a relationship between VFIDs and DMA functions.

8. The method of claim 7, wherein the settings include:
a single VFID/DMA function;
a multiple VFID mode on a per DMA function basis; and
a default setting having a single VFID and all DMA functions are set to this setting.

9. The method of claim 1, further comprising translating an Ethernet Virtual Local Area Network (VLAN) to a corresponding VFID to permit Ethernet VLAN to be run over the fabric switch.

10. The method of claim 1, further comprising generating at least one error message based at least in part on the tag not matching an approved VFID.

11. The method of claim 10, wherein the at least one error message comprises a security violation notification.

12. A method of operating a switch fabric having a point-to-point network protocol, the method comprising:

generating a table defining a virtual fabric ID (VFID) for at least one defined subnet;

tagging packets of outgoing messages from at least one host with the virtual fabric ID; and determining if an incoming message to at least one host has a tag matching the virtual fabric ID;

wherein receive processing for incoming messages is supported if the tag matches the virtual fabric ID and the message is dropped within the switch if the tag does not match the virtual fabric ID.

13. The method of claim 12, wherein the point-to-point protocol is PCI Express.

14. The method of claim 12, wherein said tagging is performed via vendor defined messaging.

15. The method of claim 12, wherein an error code is returned to a sender if the virtual fabric ID does not match.

16. The method of claim 12, wherein said determining includes checking every host-to-host packet coming out of a port and dropped the packet unless it has been tagged with a valid virtual fabric ID.

17. The method of claim 16, where said determining includes checking at each receiving port for a valid virtual fabric ID and dropping packets having invalid tags.

18. The method of claim 12, wherein the switch fabric includes virtual Direct Memory Access (DMA) engine functions for each port, wherein said receiving comprises: receiving from a fabric administrator one or more settings, including setting a relationship between VFIDs and DMA functions.

19. The method of claim 18, wherein the settings include:
a single VFID/DMA function;
a multiple VFID mode on a per DMA function basis; and
a default setting having a single VFID and all DMA functions are set to this setting.

20. The method of claim 12, further comprising translating an Ethernet Virtual Local Area Network (VLAN) to a corresponding VFID to permit Ethernet VLAN to be run over the fabric switch.

21. The method of claim 12, further comprising generating at least one error message based at least in part on the tag not matching an approved VFID.

22. The method of claim 12, wherein the at least one error message comprises a security violation notification.

23. A PCI express switch in connection with a management system, wherein a memory in the management system stores a table of virtual fabric IDs to enforce security and segregation of host-to-host message flows for hosts coupled to the PCI express switch.

* * * * *